United States Patent [19]

Matich et al.

[11] Patent Number: 4,580,925

[45] Date of Patent: Apr. 8, 1986

[54] PERVIOUS SURROUND METHOD OF WASTE DISPOSAL

[76] Inventors: Miroslav A. J. Matich, 79 Bywood Drive, Islington, Ontario, Canada, M9A 1M2; Wing F. Tao, 7 Canleigh Court, Islington, Ontario, Canada, M9A 3Y2

[21] Appl. No.: 605,367

[22] Filed: Apr. 30, 1984

Related U.S. Application Data

[63] Continuation-in-part of Ser. No. 363,555, Mar. 30, 1982, abandoned.

[51] Int. Cl.$^4$ .............................................. E02C 3/00
[52] U.S. Cl. ...................................... 405/128; 405/52; 405/53
[58] Field of Search ................... 405/128, 129, 52, 53, 405/270; 210/170, 628; 252/633

[56] References Cited

U.S. PATENT DOCUMENTS

| | | | |
|---|---|---|---|
| 4,171,921 | 10/1979 | Morfeldt | 405/128 |
| 4,288,174 | 9/1981 | Laws | 405/129 |
| 4,335,978 | 6/1982 | Mutch | 405/129 |
| 4,430,021 | 2/1984 | Wagner et al. | 405/129 |
| 4,430,256 | 2/1984 | Rustum | 405/129 X |
| 4,439,062 | 3/1984 | Kingsbury | 405/129 |

Primary Examiner—Dennis L. Taylor
Attorney, Agent, or Firm—Cushman, Darby & Cushman

[57] ABSTRACT

A method of disposing of toxic (e.g. radioactive) wastes, and related waste containment facilities, allow local long term containment of wastes in a cost-effective manner, while controlling to innocuous levels the release of contaminants. A cavity is provided in the ground below the level of the groundwater table, and a continuous pervious zone of natural, durable material is disposed about the interior of the cavity. A filter zone of natural, durable material is disposed within the pervious zone, and has materials of a grain size and gradation common to conventional graded filter materials. A waste disposal zone is provided within the filter zone, the disposal zone for receiving waste deposits, and a cover is placed over the cavity. The cover is a continuation of the filter zone, and the pervious zone over the cavity, and beneath the level of groundwater table, so that the groundwater level reinstates over the deposited waste.

11 Claims, 3 Drawing Figures

PERVIOUS SURROUND METHOD OF WASTE DISPOSAL

CROSS REFERENCE TO RELATED APPLICATION

This application is a continuation-in-part of application Ser. No. 363,555 filed Mar. 30, 1982, now abandoned.

FIELD OF INVENTION

The present invention relates to a method and means for the disposal of toxic waste materials, and permanent isolation of toxic substances already in the ground, below the natural groundwater table by using a pervious envelope to isolate the deposited waste from the surrounding groundwater flow system. The invention has utility in long term disposal of wastes such as mine tailings (including uranium tailings), industrial wastes, sanitary landfills and similar solid wastes and can also be adapted for use with other systems for disposal of special forms of wastes such as high-level radioactive wastes and liquid chemical wastes to enhance the containment capability of such disposal systems.

PRIOR ART

Current methods of waste management (particularly when on a large scale), are typically of the above-ground storage type, relying on structures such as earth fill dams to retain the solid wastes and seepage barriers composed of natural materials such as clay, bentonite or soil-bentonite mixture, or artificial material such as synthetic polymers or rubberized compounds. Other methods involve placing the wastes below ground but above the groundwater table. Such above-ground or below-ground systems are generally associated with high hydrostatic pressures acting on the seepage barriers due to their position above the natural groundwater table. Consequently, in order to effectively control seepage from the waste deposit downwards into the natural groundwater, such seepage barriers must be constructed to a high degree of uniformity, using material of extremely low permeability (or hydraulic conductivity) and very long durability. Experience has shown that it is very difficult in practice to construct a seepage barrier to meet all the above requirements. Because of either their above-ground position or shallow burial depth, such systems are also vulnerable to damage due to man-made events or natural phenomena.

The present trend for disposal of wastes such as high level radioactive wastes is to select sites below the groundwater table at depth in bedrock where the permeability of the surrounding rock is low and to store the wastes in elaborate containers within chambers in the rock.

A number of prior art methods of underground disposal of toxic wastes are disclosed in the following patents:
  (i) Canadian Pat. No. 766,471
  (ii) U.S. Pat. No. 3,379,013
  (iii) Canadian Pat. No. 764,674
  (iv) U.S. Pat. No. 3,108,439
  (v) U.S. Pat. No. 3,196,619
  (vi) U.S. Pat. No. 3,274,784
  (vii) Canadian Pat. No. 1,096,644
  (viii) U.S. Pat. No. 4,192,629
  (ix) U.S. Pat. No. 4,171,921
  (x) U.S. Pat. No. 4,288,174

Items (i) through (vi) of the above inventions involve mixing the waste material with clay, bentonite, oil based fluids or other suitable chemicals and pumping the mixed slurry into fractures in subterranean rock formations in which the slurry later solidifies into an inert gel. These methods appear to be limited to disposal of small quantities of waste material and require intensive control during placement. Items (vii) and (viii) disclose a method of using underground repositories for storage of radioactive material including spent fuel from nuclear reactors. The method involves suspending a hollow body containing the waste material in clay filling inside a rock cavity. This method appears to have some practical difficulties in construction and maintenance.

Item (ix) discloses a method of dewatering in the vicinity of a toxic dump located at or near ground level above the groundwater table using a tunnel having a water permeable wall formed below the natural groundwater level. This tunnel, when pumped quickly enough and continuously, forms a sink funnel in the subsoil or bedrock. The liquid pumped from the tunnel (or other special cavities formed in the ground) is conveyed to a suitable location for further treatment. This prior art has the disadvantage of not providing a permanent and maintenance free system of disposal of toxic waste since it depends for its effectiveness on continuous pumping. It also has the deficiency that because of details in the subsoil or bedrock, such as pervious layers, faults, fissures or fractures, not intersected by the tunnel or other cavities formed for purposes of pumping, flow of contaminated groundwater may by-pass the pumping system. It has the further deficiency that holes bored from the tunnels or other cavities to induce groundwater flow to the latter, may become clogged with time due to encrustation by chemicals contained in the groundwater, or that the holes or tunnels may be reduced in effectiveness due to movements in the ground associated with earthquakes or other causes.

Item (x) teaches the method of diversion of groundwater by using one or more conduits located beneath the groundwater level substantially around the circumference of the designated land area. There is also mention of the surrounding such a designated land area with a gravel-filled trench. The system described in this patent may reduce the rate of groundwater flow by decreasing the groundwater potential energy difference between points within the circumferential conduits or trench. The system does not, however, teach the construction of a waste deposit site below the groundwater table, nor is it concerned with the overall problem of waste disposal and does not purport to deal with a number of containment transport modes other than physical seepage such as molecular diffusion, mechanical dispersion and migration of contaminents through unsaturated soils. Moreover, the construction taught in this patent to suffer the deficiency that the wells and conduits are subject to eventual plugging in the long term due to effects of encrustation, ground movement and other causes, which are well-known in the art. The system also suffers another deficiency in that discrete units, such as wells and conduits, do not ensure complete interception of groundwater flow because of "mounding" between wells and because of the influence of geological details, such as faults or fissures, which may result in bypassing of individual wells or conduits. Accordingly, the system taught by this patent does not direct itself to nor does it meet the basic requirements for permanent maintenance-free toxic waste disposal facility, but instead is directed to the isolation of an area of recharge of groundwater associated with downward migration of contaminants from waste deposited on or within the designated land area. It is apprehended by the present applicants that this system would also suffer deficiencies even within the scope of its intended application in that the potential heads built up as a result of groundwater mounding due to recharge (infiltration from the waste deposit, precipitation or surface water) over the designated area occupied by the waste. In other words, the recharge over an area must always result in an outflow of groundwater from the area to establish hydrodynamic balance. Therefore, it is anticipated that the system described by this patent would result in an outflow of contaminated water, notwithstanding the measures taken.

Because of the limitations in the application of the above prior art methods, they have not been adopted in practice for dealing with the disposal of the toxic waste materials such as uranium mine tailings on a large scale.

OBJECTS

It is an object of this invention to provide a novel method for the disposal of wastes which does not suffer deficiencies of the prior art.

It is an object of this invention to provide a method for the disposal of wastes in soils or bedrock, at sites beneath the groundwater level.

It is an object of this invention to provide a method of local long term containment of areas of underground storage of products, for example, oil in special caverns or backfilling as in the case of underground mines.

It is an object of this invention to provide a cost effective method and means for controlling to innocuous levels the release of contaminants from stored waste deposits.

It is an object of this invention to provide a method and means which, in conjunction with other conventional means for creating low permeability barriers to seepage, will allow improved performance over long periods of time under a wide variety of site conditions for a wide range of toxic wastes.

It is an object of the present invention to provide a method of long term disposal (or isolation) of toxic wastes using simple, well-tried methods of construction and natural materials of rock and soil which are known to be durable.

It is an object of this invention to provide a method and means for waste disposal which reduces physical seepage of groundwater through the waste deposit to negligible rates in the long term, thus controlling the rate of release of contaminants to the biosphere to innocuous levels.

It is an object of this invention to provide a method which can be adapted for use with other systems for disposal of special forms of wastes such as high-level radioactive wastes and liquid chemical wastes to enhance the containment capability of such disposal systems.

It is an object of this invention to effectively isolate fine-grained solid toxic wastes from the surrounding groundwater by controlling the amount of physical movement or seepage of water from or through the waste deposit, thereby maintaining the concentration of contaminants in receiving waters at innocuous levels.

It is an object of this invention to provide a maintenance-free system of waste disposal which permits ready and positive monitoring of its performance both during the operating stage of waste deposition and in the long term after close-out or decommissioning of the disposal area.

It is an object of this invention to provide a system of waste disposal which permits incorporation of fall-back contingency measures whereby total containment of contaminants could be achieved, should it become necessary at any time in the long term after decommissioning of the waste disposal area.

PRINCIPLE OF INVENTION

The physical law governing water seepage through porous media depends on the driving forces, expressed in terms of the hydraulic gradient, i, as well as the permeability or hydraulic conductivity, k, of the material. This is stated in the form of Darcy's Law, as follows:

$$v = k \cdot i$$

in which v is a measure of the rate of seepage, termed Darcy flux. Accordingly, it is observed that it is possible to regulate the rate of seepage by varying either the hydraulic gradient or the permeability of the material. Current methods of waste disposal, including most of the patented methods referred to above, attempt to control the rate of seepage by using seepage barriers of low permeability without attempting to limit the hydraulic gradient. Recognizing the limitations of such systems, the present invention has been developed involving the use of a highly pervious envelope of natural, durable material surrounding the waste deposit in such a way that the hydraulic gradient across the waste deposit may be reduced to practically zero. This achieves the results which can be as effective as a seepage barrier of very low permeability materials.

If a structure is erected above the groundwater table to store large quantities of toxic wastes there will be significant hydraulic gradients developed. If the toxic wastes are 100 feet deep, for example, and the barrier or membrane of the structure is 3 feet thick, the membrane will be subjected to a hydraulic gradient of about 100/3 or 33.3.

On the other hand, if the waste were to be disposed of in soil or bedrock beneath the groundwater table in an area where the groundwater gradient is low, the hydraulic head differential across the waste deposit can, by this invention, be reduced to a value close to zero. In practice, for example, hydraulic gradients of as low as $10^{-5}$, or lower, can be achieved.

This principle is important because there is virtually no known material which can be used to construct a membrane which will remain impervious to seepage for hundreds of thousands of years under the effects of deterioration, erosion, earth and ice movements and human activity. All types of membranes will eventually break down and if there is a significant hydraulic gradient then substantial seepage and contamination of groundwater will occur.

Although Darcy's Law is well established in civil engineering practice as the law governing water seepage through porous media under moderate to high hydraulic gradients, it is not valid when low hydraulic gradients are involved. This non-Darcian behaviour has been demonstrated by many researchers such as Hansbo (1960), Mitchell and Younger (1967) and Law and Lee (1981). The departure from Darcian flow behaviour is exhibited in two ways:

(i) a pronounced decrease in effective permeability of the porous medium, (i.e. increase in resistance to physical flow through the medium) at low hydraulic gradients;

(ii) complete cessation of physical flow through the porous medium when the driving force (hydraulic gradient) is below a certain minimum "threshold" value.

The phenomenon of non-Darcian behaviour of physical seepage of water under the low gradients gives a significant added advantage to the approach of achieving seepage control by reduction of hydraulic gradient as proposed in the present invention over the conventional methods in which low permeability seepage barriers are employed.

This invention provides a zone which in certain embodiments act as a filter. The primary function of the filter is to prevent migration of solid particles from the waste deposit into the pervious zone. It also serves to control the already comparatively minor rate of release of contaminants from the waste deposit by secondary mechanisms such as mechanical dispersion and molecular diffusion. By selecting material of suitable gradation intermediate between the pervious zone and the waste deposit for construction of the filter, it can be made to fulfil not only its primary function, but also to be of sufficiently low permeability compared to the pervious zone such that seepage velocities within the filter zone become sufficiently low to eliminate or limit the effects of mechanical dispersion.

Molecular diffusion occurs in water which could be physically stationary and is essentially independent of the permeability of the porous medium in which the phenomenon occurs. Thus the use of low permeability liners in conventional waste systems has no advantage over the present invention in this regard. Because the rate of molecular diffusion is dependent on the concentration gradient of the electrolyte under consideration, the rate of release of contamimants from the waste deposit due to molecular diffusion can be kept to an acceptable level by selecting the width of the filter of this invention.

It will be appreciated that in principle this invention may be utilized in virtually any type of ground and groundwater conditions with varying degrees of utility and cost effectiveness. However, it is advisable to select sites which are suited to this invention to obtain the best results. Considerations to be taken into account when selecting suitable disposal sites are:

(a) proximity to the source of the wastes to be disposed of;

(b) availability of natural or man-made, surface or subsurface cavities such as quarries, abandoned pits, mines, caverns and the like;

(c) economic and engineering considerations such as the cost and difficulty of drawing down the groundwater table during construction and disposal of toxic materials;

(d) availability of desired construction materials;

(e) hydro-geological studies to determine ability to dewater the disposal site and to establish natural groundwater gradients in the area, bearing in mind that is is desirable to have a large contrast between the permeability of the surrounding terrain and the waste materials compared to the pervious surround.

It will be appreciated by those skilled in the art that the results of the hydro-geological study will be required for the design of the system for any particular ground configuration and conditions.

It will also be appreciated that the disposal of certain waste materials such as those which will give off significant quantities of gas or liquid wastes may require special treatments to achieve the desired containment and isolation. However, the principle of the improvement offered by the pervious surround method and means of this invention will be applicable in conjunction with other methods of containment and isolation which may be required.

STATEMENT OF INVENTION

The present invention provides a method of reducing seepage from deposits placed in a disposal zone in soil or bedrock beneath groundwater level comprising the improvement of providing a highly pervious zone about the disposal zone, being sufficiently distant therefrom to permit groundwater to flow around the disposal zone to reduce the hydraulic gradient across the disposal zone and the seepage from toxic wastes to an acceptable level.

The present invention also provides a means for the disposal of waste deposits in soil or bedrock beneath groundwater level comprising a continuous layer of highly pervious material, referred to hereafter as the pervious zone, constructed around a toxic waste deposit located in a cavity below the natural groundwater table. The pervious zone may be constructed of coarse-grained, inert and durable material such as rock fill, sand and gravel fill, rock fractured in-situ by blasting or hydraulic fracturing. Moreover, both these methods may be used together to make the pervious zone. Other suitable construction methods, considered appropriate by those skilled in the art, may also be employed to construct the pervious zone.

It will be appreciated that groundwater flow may vary from location to location about the cavity in volume and direction and that this will depend on ground formations and conditions and that these considerations will be taken into account in determining the location and nature of the pervious zone. Other considerations will include the forecasts for changes in the level, direction and extent of groundwater flow in the future as a result of geological changes, erosion and other conditions.

The pervious zone and any contiguous pervious surface to the cavity walls should be of sufficiently high permeability to reduce the hydraulic gradient across the waste deposits in the disposal zone to a low value so the reduction in seepage will be obtained. It is preferred that the pervious zone reduce the hydraulic gradient to a negligible value so that practically no seepage will occur through the waste deposits.

The pervious zone is separated from the solid waste, which is generally of fine-grained material or may contain fine particles of toxic material, by a suitable filter zone composed of inert earth or rock fill of intermediate grain size between the materials of the pervious zone and the toxic waste. Alternatively, the pervious zone may be separated from the waste deposit by natural ground or soil or rock by constructing it at a distance from the waste deposit.

The filter zone should be of sufficient thickness to reduce diffusion effects between the disposal zone and the pervious zone to acceptable levels. Further, it should be designed to account for future erosion effects, if any, and for other conditions which may tend to degrade or change its make-up or structure over long periods of time. The design criteria of the filter zone will be available to those skilled in the art after completing the required studies of the site and the characteristics of the deposits to be disposed of. Conventional graded filter grain size and gradation criteria may be utilized to design a filter of the required thickness and permeability.

It is preferred that the filter zone should include or comprise one or more layers of material of gradation(s) selected to prevent migration of the solid particles of the stored deposits into the pervious zone. At the same time, it is preferred that the filter zone should, as a whole, be of such permeability as to permit drainage of water from the waste deposit during the operating stage of waste deposition, thereby facilitating necessary consolidation of the deposits under self-weight, but at the same time maintaining sufficiently low seepage velocities through itself so that mechanical dispersion becomes insignificant as a mechanism of contaminant transport from the waste deposit through the filter zone into the pervious zone.

The deposition of materials to be disposed of into the prepared cavity should never go higher than the top of the pervious zone and the filter zone.

The cavity may be covered by constructing a filter zone and a pervious zone over the opening or where the opening of the cavity is above the groundwater table. In other embodiments it may be sufficient to cover the cavity with soil or other material and in some cases the site may be wholly or partly under open water.

One method of this invention involves the steps of:
(a) obtaining a cavity beneath the groundwater table;
(b) providing a pervious zone about the cavity to intercept groundwater having a pre-existing path of movement through the cavity, said pervious zone being adapted to provide a path of least resistance for said groundwater about the cavity to permit the groundwater to return to the pre-existing defined path of movement of the groundwater after passage about the cavity;
(c) providing a filter zone inside the pervious zone;
(d) providing a disposal zone inside the filter zone, said disposal zone being adapted to receive deposits of materials to be disposed of;
(e) depositing materials to be disposed of beneath the groundwater table by means of suitable methods of isolation and containment;
(f) covering the cavity.

More particularly this method may include the steps of:
(a) obtaining a cavity beneath the groundwater table;
(b) dewatering the cavity;
(c) providing a pervious zone about the cavity as described above;
(d) providing a filter zone as described above;
(e) providing a disposal zone within the filter zone;
(f) depositing materials to be disposed of in the disposal zone;
(g) covering the cavity.

In the dewatering step, the pervious zone is connected to a pumping system which permits dewatering of the surrounding natural ground and the waste deposit (and any natural ground) contained within the pervious zone. The effect of dewatering by pumping from the pervious zone creates a cone of depression of the natural groundwater table surrounding the pervious envelope. By doing so during the operating stage of waste deposition, not only is a dry working surface maintained within the pervious zone but also the groundwater surrounding the waste deposit is forced to flow toward the pervious zone. This ensures complete interception of all contaminated water during the operating stage by the pervious zone, which can be routed through a suitable treatment facility for purification prior to discharging to receiving waters.

This dewatering procedure accelerates consolidation of the waste under self-weight. It is continued for as long as necessary after completion of waste deposition until the waste deposit is consolidated to a degree wherein there will be no more potential for contaminated water to be expelled from the waste deposit when the natural groundwater table is reinstated over the top of the waste deposit.

FIGURES

In the figures which illustrate preferred embodiments of this invention;

DESCRIPTION OF EMBODIMENTS IN FIGURES

Figure 1:
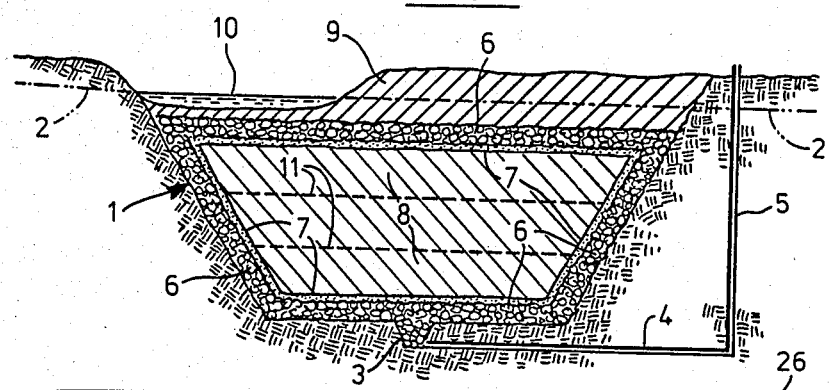
FIG. 1 is a schematic in vertical section of a waste disposal site constructed in accordance with this invention.

The waste disposal site in FIG. 1 is seen to comprise a cavity which is an open pit (1) having substantial portions thereof beneath the groundwater table (2).

The groundwater table (2) is at an angle to the horizontal up to the open pit (1) and afterwards indicating flow of groundwater from left to right on the page. For the purposes of this illustration it will be assumed that all the groundwater in the area flows in this direction.

The open pit (1) could be a natural depression, a quarry or an abandoned mined-out pit from open pit or strip mining or could be specially excavated for disposal. It is preferred that the open pit (1) be located in a valley or recess between points of higher ground so that the effects of ice movement in the event of an ice age are reduced.

The open pit (1) is first equipped with a suitable dewatering system which could constitute a rock filled sump (3) with a tunnel (4) and shaft (5) arrangement as shown in FIG. 1 or other system as might be deemed appropriate by those skilled in the art. The dewatering system provides control of the groundwater seepage during the operating period of waste deposition into the open pit (1) so that a dry working surface can be maintained in the open pit (1). At the same time, this dewatering system serves an important function of producing a cone of depression in the groundwater table surrounding the pit. This provides positive control of the direction of groundwater flow towards the pit and ensures that any water which may become contaminated while waste is being placed into the pit, is captured by the dewatering system and can be treated as required before discharging into natural receiving waters, during this operating stage. This dewatering system also serves as part of the monitoring system for postdecommissioning water quality sampling and as a fall-back contingency measure which permits positive control of contaminant release by hydrodynamic containment in the long term after decommissioning should this be found necessary.

The pit is prepared for initial deposition of waste by first laying down a layer of pervious material (6) such as select rock fill of suitable gradation, over the sump and the bottom of the pit. This layer of pervious material is extended a suitable height up the side-slopes of the pit, (which may be fractured in advance to increase permeability) depending on the expected rate of waste deposition into the pit. Subsequently, a suitable zone of filter material (7) such as select sand and gravel or rock fill filter-graded with the pervious materials (6) and the waste (8) to be deposited into the pit is placed over the pervious material. Selection of the gradation of the pervious materials (6) and filter material (7), as well as their respective thicknesses, is a matter of geotechnical engineering design which will vary with conditions, sites and applications.

The pervious envelope (6) and filter zone (7) are raised upwards in low lifts, allowing progressive deposition of waste (8) until the open pit (1) is filled to capacity at a predetermined level below the natural groundwater level (2). During the entire period of waste deposition, dewatering by pumping from the bottom sump (3) (or other suitable dewatering measures) is carried out continuously as required to maintain the water level immediately surrounding the open pit (1) to levels below the surface of the waste at any time, and preferably to the level of the base of the waste deposit to promote consolidation of the waste to a state of compaction in excess of that attainable under the weight of the waste once the groundwater level is reinstated to its original position.

Following completion of deposition of the waste material, the open pit (1) may be backfilled to original ground level with earth or rock fill. In the case of uranium tailings, the earth cover would be sufficient to provide protection against radon emission or other radiation effects.

Dewatering from the bottom sump (2) (or other suitable dewatering system) is continued after this backfilling operation until the waste deposit becomes over-consolidated with respect to the ultimate condition of reinstated groundwater level above the waste deposit, as discussed above. This state of consolidation can be determined by monitoring with piezometers installed within the waste deposit.

After the necessary degree of consolidation of the waste material has been obtained, the dewatering operation is temporarily suspended to allow the groundwater level to recover up to the top of the waste deposit. The dewatering is then resumed to draw down the water level to the base of the waste deposit accompanied by sampling of the water for analysis to determine its quality. The dewatering is then suspended again and the above procedure repeated until the quality of water sampled meets required standards. This point is then considered final decommissioning.

It may be observed in FIG. 1 that the pervious zone (6) and the filter zone (7) are constructed to completely envelop the waste material (8) on all sides and that the open pit (1) is sealed by contructing these zones continuously over the top of the pit as well. Afterwards, the open pit (1) may be further sealed by covering with fill or other soil (9) depending on original conditions and even open water (10). Further, within the waste zone (8), horizontal drains (11) may be constructed, if required, to aid consolidation of the waste during deposition.

Selection of the gradations of the pervious material (6) and filter material (7), as well as their respective thicknesses, is made to satisfy the following basic requirements:

(1) The pervious zone (6) has to be of sufficient permeability to reduce the hydraulic gradient across the waste deposit (8) to a negligible value so that practically no seepage will occur through the waste deposit under post-decommissioning conditions.

(2) the filter zone (7) should comprise one or more layers of material of gradation(s) selected to prevent migration of solid particles of the waste material (8) into the pervious zone (6). At the same time the filter zone (7) as a whole, should be of such permeability as to permit drainage of water from the waste deposit under self-weight, but also maintaining sufficiently low seepage velocities through itself so that mechanical dispersion becomes insignificant as a mechanism of contaminant transport from the waste deposit (8) through the filter zone (7) into the pervious zone (6).

In order to obtain sufficient information to design the pervious envelope and filter of this invention, it is necessary to carry out a geotechnical and hydrogeological investigation of the site selected for waste disposal to determine the permeabilities of the soil and rock formation and ground water conditions. Permeabilities of the wast material under Darcian and non-Darcian flow conditions have to be determined also.

Based on such information, seepage analyses are carried out using trial dimensions and assumed permeabilities of materials for the pervious zone to determine the required thickness of the pervious zone and its permeability to reduce the seepage of groundwater through the waste deposit to a negligible or acceptable rate. Because the permeability of materials which are suitable for construction of the pervious zone covers a range of some three to four orders of magnitude it is by far the controlling factor determining the effectiveness of the pervious zone. It is thus appropriate and expedient to first assign a suitable width of the pervious zone based on practical minimum width considerations for construction and economics. The necessary minimum permeability of the pervious zone is then determined by seepage analyses. Based on this required minimum permeability for the pervious zone, a suitable gradation of rock fill or sand and gravel is selected for its construction.

Darcy's law can only be applied directly in solving one-dimensional flow problems. Groundwater seepage is generally three-dimensional and involves complex variations in permeability between zones of different materials. In general no analytical solutions are available for such seepage problems and numerical methods have to be resorted to in modelling the seepage conditions. Currently, a number of computer programs based on the finite element method are available for solving two and three-dimensional seepage problems. However, programs for solving three-dimensional problems are restricted to very simplified ground conditions and are not capable of adequately modelling the problem at hand. Because groundwater flow en masse tends to follow near-horizontal planes, it is more appropriate to model seepage flow along such planes.

Figure 2:
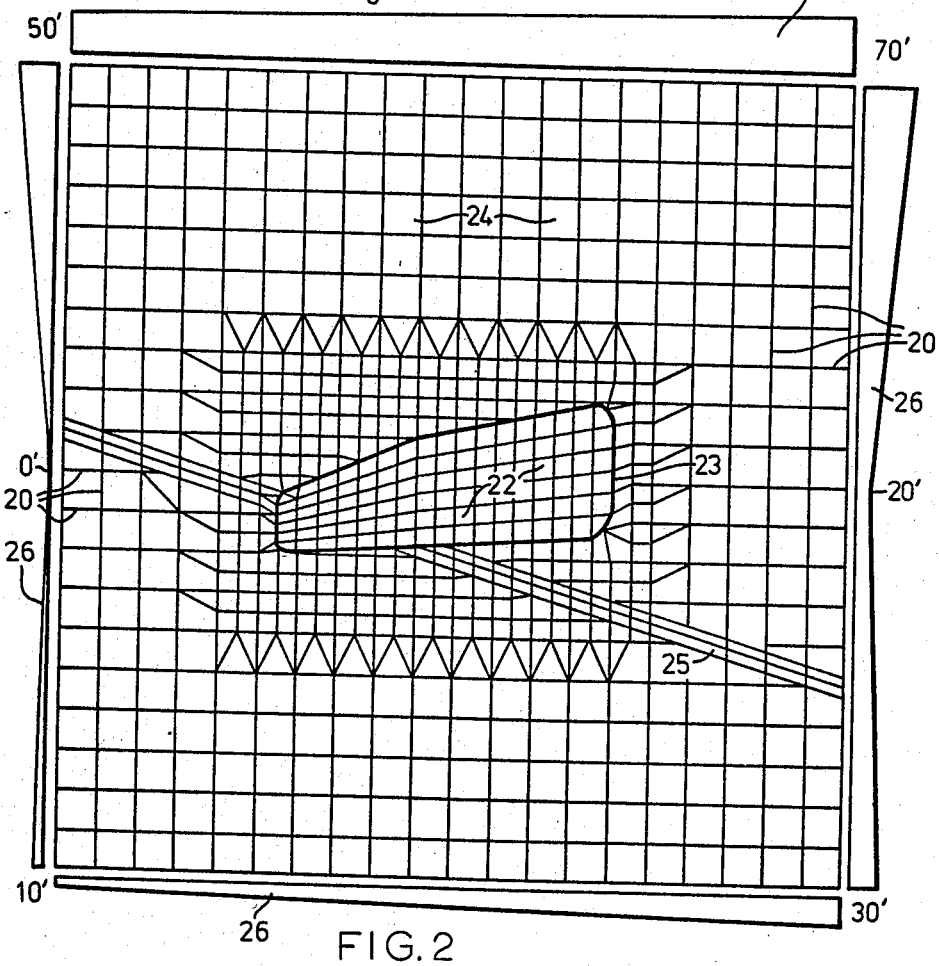
FIG. 2 shows the typical input data in analyzing a horizontal seepage model for the waste disposal system in FIG. 1.
Figure 3:
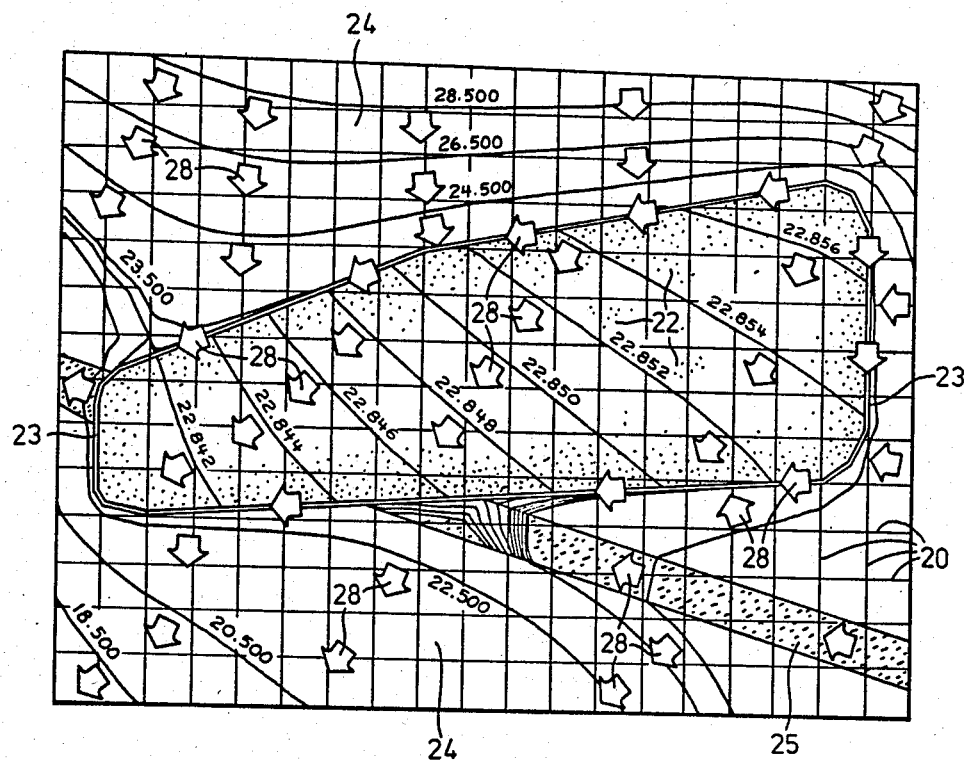
FIG. 3 shows the typical results of the seepage analyses carried out on the model in FIG. 2.

FIG. 2 and FIG. 3 show typical graphical input and output information in a sample analysis modelling the groundwater flow along a horizontal plane through a pervious zone surrounding a waste deposit located in an open-pit in bedrock which is assumed to contain a fault zone intersecting the open-pit.

FIG. 2 shows the finite element mesh (20) which divides the seepage domain of the model into a large number of discrete elements. Each element is composed of a single material with an assigned permeability in the case of an isotropic material, or the principal permeabilities in the case of an anisotropic material. In the sample analysis shown, the materials are assumed to be isotropic with the following permeabilities:

Waste material (22): $1 \times 10^{-4}$ cm/sec
Pervious zone (23): 100 cm/sec
Bedrock (24): $5 \times 10^{-5}$ cm/sec
Fault zone (25): $1 \times 10^{-3}$ cm/sec The overall dimensions of the model are 2000 feet by 2000 feet square. The waste deposit (22) is approximately 850 feet long and 150 to 350 feet wide. The pervious zone (23) is 5 feet thick. The fault zone (25) is 50 feet wide. Applied hydrostatic heads along the boundaries of the model are shown as head distribution diagrams (26) indicating the values of hydrostatic heads in feet at the ends or mid-points of the head distribution diagrams (26). These head distributions correspond to hydraulic gradients of 5 percent or 1 percent as the case may be.

FIG. 3 shows part of the results of the analysis plotted graphically by computer. It shows an enlarged detail of the central part of the model shown in FIG. 2, with the finite element mesh (20), the waste deposit (22), the pervious zone (23), part of the bedrock (24) and part of the fault zone (25). The computed head distributions are plotted in the form of equipotential lines (30) with numerals indicating the hydrostatic heads in feet along the equipotential lines. Directions of groundwater flow (28) through the various zones of materials are interpreted from the equipotential lines.

Results from this sample analysis gave a maximum hydraulic gradient in the waste deposit of $3.20 \times 10^{-6}$ which could be considered zero for all practical purposes. The computed total flow through a 1 foot vertical thickness of the waste deposit assuming Darcian flow is $4.394 \times 10^{-4}$ cubic feet per day, and through the pervious zone 6.455 cubic feet per day. Thus, not only is the quantity of seepage through the waste deposit negligibly small, but also the very high ratio of flows through the pervious zone and the waste deposit (14960:1), computed assuming Darcian flow to prevail even under the above-mentioned extremely low hydraulic gradient through the waste deposit, would result in innocuous levels of contaminant concentrations for most types of wastes such as mine tailings, including uranium tailings.

Similar analyses carried out to investigate the relative effects of variations of permeabilities of the various zones of materials indicate that the most significant factor influencing the effectiveness of the pervious zone in controlling the rate of seepage through the waste deposit is the ratio of the permeability of the pervious zone to the permeability of the waste deposit. In general, this ratio would have to be $10^5$ or higher in order to achieve contaminant concentrations in the pervious zone less than one-thousandth (1/1000) of the contaminant concentrations in the waste deposits. Because only water in the pervious zone in the present system is in contact with the surrounding groundwater system, thus, when the contaminant concentration at the source (i.e. the pervious envelope of this invention) is maintained at very low levels meeting water quality standards, further pathway analyses would not be required. Contaminant concentrations in the pervious zone somewhat higher than those specified to meet water quality standards, however, are not unacceptable because attenuation of such contaminant concentrations is certain to occur along pathways through the groundwater before the contaminants enter receiving water bodies of concern. In such cases, pathway analyses of contaminant transport through the groundwater would be required.

Another important finding of the analyses is that although flows through the pervious zone and the waste deposit tend to increase proportionally with increase im permeability of the soil or rock immediately surrounding the pervious zone, the ratio of flows in the pervious zone and the waste deposit is largely independent of changes in the permeability of the soil or rock. Similarly, the ratio of flows is largely independent of moderate changes in the hydraulic gradients of the groundwater immediately surrounding the pervious zone. This is a major advantage of this invention over conventional systems in that the performance of the system of this invention can be assessed to a higher degree of confidence when it is less dependent on a very thorough knowledge of the details of hydrogeological conditions of the surrounding ground, compared to conventional systems.

When a condition of practically stationary groundwater surrounding the waste deposit is achieved, the rate of transport of contaminants away from the waste deposit is dependent on molecular diffusion. Such a process is extremely slow, typically involving advancement of the front of contaminants in the order of 10 meters over a period of 1000 years. By locating the pervious wall at a suitable distance away from a radioactive waste deposit the concentration of radioactive isotopes reaching the pervious wall can be controlled to any desirable level by natural decay of the radionuclides and other geochemical attenuation processes such as absorption and retardation. For non-degradable contaminants, the rate of release from the waste deposit by molecular diffusion can also be controlled to innocuous levels by locating the pervious wall at a suitable distance away from the waste deposit because the rate of release of contaminants from the waste deposit is proportional to the distance between the pervious wall and the waste deposit, and thus it can be reduced by increasing this distance as required.

It will be appreciated by those skilled in the art that this invention may be used with many other types of waste disposal methods to improve the isolation of the waste from the groundwater. It will also be appreciated that this invention may be practiced in many forms in many different locations and conditions without departing from the principles described and disclosed herein.

The embodiments of this invention in which an exclusive property or privilege is claimed are defined as follows:

1. A method of disposal of waste deposits involving the steps of:
    (a) obtaining a cavity in the ground below a level of present or anticipated groundwater tables;
    (b) providing a continuous pervious zone of natural, durable material about the interior of the cavity, said pervious zone being characterized by having a significantly greater permeability than the adjacent ground and the waste deposit and being of a thickness predetermined to provide adequate transmissivity to transmit the flow of all groundwater intercepting said pervious zone from the ground about the waste deposit;

(c) providing a filter zone of natural, durable material next within the pervious zone, said filter zone characterized by having materials of a grain size and gradation common to conventional graded filter materials and being intermediate in size to the grain size of the waste deposit material and the pervious zone material, and having a permeability and a thickness predetermined to suppress dispersion of the waste deposit and to control the concentration gradient of molecular diffusion from the waste deposit through the filter zone to the pervious zone to predetermined acceptable levels;

(d) providing a waste disposal zone within the filter zone, said disposal zone being adapted to receive waste deposits;

(e) depositing waste deposits in the disposal zone beneath the groundwater table;

(f) covering the cavity by continuing the filter zone and the pervious zone over the cavity beneath the level of present or anticipated groundwater tables; and (g) allowing the groundwater level to reinstate over the deposited waste.

2. The method of claim 1 in which the cavity is dewatered prior to and during the deposition of the materials to be disposed of in the disposal zone.

3. The method of claim 2 in which the dewatering continues after deposition of the materials to be disposed of until such time as the deposited materials have consolidated under their self-weight.

4. The method of claims 2, or 3 in which the filter zone is constructed by making up layers of materials of gradations selected to prevent migration of the solid particles of the stored deposits into the pervious zone while being of such permeability as to permit drainage of the water from the waste deposits during waste deposition thereby facilitating consolidation of the deposits under self-weight, but maintaining sufficiently low seepage velocities through the filter zone so that mechanical dispersion becomes insignificant as a mechanism of contaminant transport from the waste deposits through the filter zone into the pervious zone.

5. The waste disposal method as described in claim 1 in which the pervious zone is constructed of crushed rock.

6. A waste disposal method as described in claim 5 in which the pervious zone is constructed of fractured bed-rock.

7. A waste disposal method of claims 1, 2, or 5 wherein reinstatement of the groundwater includes allowing open water to lie over the deposited waste site.

8. A method of reducing to acceptable levels contaminant transport from deposits placed in a disposal zone beneath groundwater level comprising the improvement of providing a continuous highly pervious zone beneath the groundwater level and about the disposal zone to reduce hydraulic gradients across the disposal zone thereby reducing contaminant transport by seepage from the disposal zone to acceptable levels and said pervious zone being sufficiently distant from said disposal zone to reduce contaminant transport by diffusion to acceptable levels.

9. A waste containment facility comprising a disposal zone beneath groundwater level having a highly pervious zone beneath groundwater level about said disposal zone being adapted to reduce hydraulic gradient across the disposal zone thereby reducing contaminent transport by seepage from the disposal zone to acceptable levels and said pervious zone being sufficiently distant from said disposal zone to reduce contaminent transport by diffusion to acceptable levels.

10. A waste contaminent transport facility comprising:

(a) a cavity in the ground below a level of present or anticipated groundwater tables;

(b) a continuous pervious zone of natural, durable material about the interior of the cavity, said pervious zone being characterized by having a significantly greater permeability than the adjacent ground and the waste deposit and being of a thickness predetermined to provide adequate transmissivity to transmit the flow of all groundwater intercepting said pervious zone from the ground about the waste deposit;

(c) a filter zone of natural, durable material next within the pervious zone, said filter zone characterized by having materials of a grain size and gradation common to conventional graded filter materials and being intermediate in size to the grain size of the waste deposit material and the previous zone material, and having a permeability and a thickness predetermined to suppress dispersion of the waste deposit and to control the concentration gradient of molecular diffusion from the waste deposit through the filter zone to the pervious zone to predetermined acceptable levels;

(d) a waste disposal zone within the filter zone, said disposal zone being adapted to receive waste deposits;

(e) a cover over the cavity being a continuation of the filter zone and the pervious zone over the cavity beneath the level of present or anticipated groundwater tables; and whereby the groundwater level reinstates over the deposited waste.

11. The waste containment facility of claims 9 or 10 in which the filter zone is made up of layers of materials of gradations selected to prevent migration of solid particles of stored deposits into the pervious zone while being of such permeability as to permit drainage of water from waste deposits during waste deposition thereby facilitating consolidation of deposited material under self-weight, but maintaining sufficiently low seepage velocities through the filter zone so that mechanical dispersion becomes insignificant as a mechanism of contaminant transport from the waste deposits through the filter zone into the pervious zone.

* * * * *